United States Patent
Zheng et al.

(10) Patent No.: US 12,010,146 B2
(45) Date of Patent: Jun. 11, 2024

(54) METHOD, SYSTEM AND APPARATUS FOR UNIFIED SECURITY CONFIGURATION MANAGEMENT

(71) Applicant: Nokia Solutions and Networks Oy, Espoo (FI)

(72) Inventors: Wei Zheng, Hangzhou (CN); Cheng Cai, Hangzhou (CN); Yulong Zhang, Hangzhou (CN); Xiaoguang Zhao, Hangzhou (CN); Silke Holtmanns, Klaukkala (FI); Ian Justin Oliver, Soderkulla (FI)

(73) Assignee: Nokia Solutions and Networks Oy, Espoo (FI)

( * ) Notice: Subject to any disclaimer, the term of this patent is extended or adjusted under 35 U.S.C. 154(b) by 355 days.

(21) Appl. No.: 17/419,180

(22) PCT Filed: Jan. 2, 2019

(86) PCT No.: PCT/CN2019/070127
§ 371 (c)(1),
(2) Date: Jun. 28, 2021

(87) PCT Pub. No.: WO2020/140205
PCT Pub. Date: Jul. 9, 2020

(65) Prior Publication Data
US 2022/0103599 A1    Mar. 31, 2022

(51) Int. Cl.
*H04L 9/40* (2022.01)
*G06F 9/455* (2018.01)
*H04L 9/32* (2006.01)

(52) U.S. Cl.
CPC .......... *H04L 63/20* (2013.01); *G06F 9/45558* (2013.01); *H04L 9/3263* (2013.01);
(Continued)

(58) Field of Classification Search
None
See application file for complete search history.

(56) References Cited

U.S. PATENT DOCUMENTS 7,231,046 B1    6/2007   Einola et al.
2010/0313019 A1  12/2010  Joubert
(Continued)

FOREIGN PATENT DOCUMENTS

CN    101127591 A    2/2008
CN    106528143 A    3/2017
(Continued)

OTHER PUBLICATIONS

"3rd Generation Partnership Project; Technical Specification Group Services and System Aspects; Network Domain Security (NDS); Authentication Framework (AF) (Release 16)", 3GPP TS 33.310, V16.0.0, Jun. 2018, pp. 1-58.
(Continued)

*Primary Examiner* — Brandon Hoffman
(74) *Attorney, Agent, or Firm* — Nokia Technologies Oy

(57) ABSTRACT

Methods and apparatus are disclosed for unified security configuration management. A method may comprise: determine a security configuration to be executed; determine at least one security application which is installed on at least one node and is associated with the security configuration; format for the security configuration, instructions corresponding to each of the at least one security application, respectively; and send the instructions to the at least one node for respective configuration for each of the at least one security application.

17 Claims, 7 Drawing Sheets

(52) U.S. Cl.
CPC ........ *H04L 63/0272* (2013.01); *H04L 63/205* (2013.01); *G06F 2009/45587* (2013.01)

(56) References Cited

U.S. PATENT DOCUMENTS

| | | | |
|---|---|---|---|
| 2015/0071139 A1* | 3/2015 | Nix | H04L 9/3066 370/311 |
| 2016/0291991 A1 | 10/2016 | Costecalde et al. | |
| 2016/0337326 A1 | 11/2016 | O'Hare et al. | |
| 2017/0085372 A1 | 3/2017 | Anderson et al. | |
| 2017/0279803 A1 | 9/2017 | Desai et al. | |
| 2017/0324566 A1 | 11/2017 | Kawasaki et al. | |
| 2018/0115521 A1 | 4/2018 | Bansal et al. | |

FOREIGN PATENT DOCUMENTS

| | | |
|---|---|---|
| CN | 107643960 A | 1/2018 |
| CN | 107749894 A | 3/2018 |
| CN | 108037961 A | 5/2018 |
| CN | 108540301 A | 9/2018 |
| CN | 108701190 A | 10/2018 |
| EP | 3196716 A1 | 7/2017 |
| GB | 2506151 A | 3/2014 |
| WO | 2007/143589 A2 | 12/2007 |
| WO | 2015/070376 A1 | 5/2015 |

OTHER PUBLICATIONS

"3rd Generation Partnership Project; Technical Specification Group Services and System Aspects; Network Domain Security (NDS); IP network layer security (Release 16)", 3GPP TS 33.210, V16.4.0, Jul. 2020, pp. 1-27.

McMullin, "The Security Building Blocks of TLS/SSL", KEMP Technologies, Inc, 2002-2014, 12 pages.

Abbott, "Cipher Rules and Groups in Big-IP V13", DevCentral, Feb. 28, 2017, pp. 1-12.

International Search Report and Written Opinion received for corresponding Patent Cooperation Treaty Application No. PCT/CN2019/070127, dated May 31, 2019, 10 pages.

Extended European Search Report received for corresponding European Patent Application No. 19906624.2, dated Jul. 18, 2022, 6 pages.

Office action received for corresponding Chinese Patent Application No. 201980087534.3, dated Apr. 19, 2022, 8 pages of office action and no page of translation available.

* cited by examiner

METHOD, SYSTEM AND APPARATUS FOR UNIFIED SECURITY CONFIGURATION MANAGEMENT

RELATED APPLICATION

This application claims priority to PCT Application No. PCT/CN2019/070127, filed on Jan. 2, 2019, which is incorporated herein by reference in its entirety.

FIELD OF THE INVENTION

Embodiments of the disclosure generally relate to information security technology, and more particularly, to a unified management framework for security configuration over a network.

BACKGROUND

Nowadays, with a rapid increase in computing capability, cryptographic algorithms that offer desired security levels previously may not be considered secure anymore. For example, SHA-1 is deprecated to be used anymore due to collision found. So, regularly it is required and recommended to apply stronger cryptographic algorithms in mobile network products to achieve security. That requires updates in existing security algorithms and configurations for all the impact areas, such as various security applications, among the products affected by the update.

Normally, applications in mobile network products need to integrate various algorithms to ensure the secure communication depending on the environment they are working in. For example, FIG. 1 lists several kinds of ciphering algorithms. In a product or huge system, many security applications, e.g. TLS (Transport Layer Security), IPSec (Internet Protocol Security), SSH (Security Shell), A1-2, A1-4, ZUC etc., can use these algorithms separately with different configuration methods. That means different applications need to maintain their ciphering algorithms configuration separately. So, once one of the algorithms upgraded, operator needs to update the applications differently. For example, as specified in 3GPP TS 33.201 for Network Domain Security—NDS/IP security for core network products, the security profiles need to be harmonized to minimize the variations of the configurations. However, it is not easy to update or modify these configurations in various affected security applications in every mobile network products efficiently.

For example, if an operator needs to update an algorithm, he/she must configure related parameters on each security application (e.g. TLS, IPSec, SSH etc.) respectively. Many operators do not have sufficient expertise and engineers to do this properly. This work requires the complex knowledge of all the different setting methods, and manual updating for configuration files, it is easy to make mistake. Such a mistake could result in no service for a whole network. Therefore, it is time consuming, and hard to keep the coincident configurations of ciphering algorithms for all security applications. On the other hand, such a configuration service needs to be properly secured and bound to the right authorized entities, so that no malicious actor can use it for their purpose and take over the network.

For above cases, it would be advantage to provide a solution to manage security configurations in products in a mobile network This invention shows a solution to manage the common cryptographic algorithms using security algorithms efficiently and securely.

SUMMARY

This summary is provided to introduce a unified framework for managing security configurations in network nodes. This summary is not intended to identify key features or essential features of the claimed subject matter, nor is it intended to be used to limit the scope of the claimed subject matter.

According to first aspect of the disclosure, it is provided a method for unified security configuration management. Said method comprises determining a security configuration to be executed; determining at least one security application which is installed on at least one node and is associated with the security configuration; formatting for the security configuration, instructions corresponding to each of the at least one security application, respectively; and sending the instructions to the at least one node for respective configuration for each of the at least one security application.

In an embodiment, the determining of the at least one security application may comprise obtaining address information of the at least one node on which the at least one security application is installed. The address information may be obtained from a virtual network function management entity In an embodiment, the determining of the security configuration may be triggered by the server. In another embodiment, the determining of the security configuration may be triggered in response to a request from one of the at least one node.

In an embodiment, the method may further comprise receiving a request for executing the security configuration; and checking whether the security configuration is supported.

In an embodiment, the node may comprise the at least one node comprises different network slices, or different virtual network functions and virtual machines.

In an embodiment, the security configuration may relate to at least one of the following: algorithms, keys, and versions of a security protocol.

In an embodiment, the method may further comprise before the sending, signing the instructions with a certificate of the server. The method may further comprise signing a state of the server; and sending the signed state to the at least one node.

According to second aspect of the disclosure, it is provided an apparatus for unified security configuration management. The apparatus comprises a cipher profiling management unit, configured to maintain profiles of supported security configurations; an application management unit, configured to maintain information of security applications that are installed on at least one node and are associated with the security configurations; and a configuration engine, configured to format for at least one supported security configuration, instructions corresponding to at least one security application associated with the at least one supported security configurations, and send the instructions to nodes on which the at least one security application is installed.

In an embodiment, the information of security applications may comprise address information of the at least one node. The application management unit may be further configured to obtain the information from a virtual network function management entity.

In an embodiment, the configuration engine may be further configured to receive a request from one of the at least one node, to trigger the formatting of the instructions and the sending of the formatted instructions.

In an embodiment, the security configuration may relate to at least one of the following: algorithms, keys, parameter for algorithms, seeds, algorithm implementations, security libraries and versions of a security protocol.

In an embodiment, the apparatus may further comprise an authorization and authentication unit, configured to sign the formatted instructions with a cryptographic key bound to a certificate of the apparatus.

In an embodiment, the authentication unit may be further configured to sign a state of the apparatus, and the configuration engine may be further configured to send the signed state to the nodes on which the at least one security application is installed.

According to third aspect of the disclosure, it is provided an apparatus. Said apparatus may comprise at least one processor, at least one memory including computer program code, the memory and the computer program code configured to, working with the at least one processor, cause the apparatus to determine a security configuration to be executed; determine at least one security application which is installed on at least one node and is associated with the security configuration; format for the security configuration, instructions corresponding to each of the at least one security application, respectively; and send the instructions to the at least one node for respective configuration for each of the at least one security application.

According to fourth aspect of the present disclosure, it is provided a computer readable storage medium, on which instructions are stored, when executed by at least one processor, the instructions cause the at least one processor to perform the method according to the first aspect.

According to fifth aspect of the present disclosure, it is provided computer program product comprising instructions which when executed by at least one processor, cause the at least one processor to perform the method according to the first aspect.

These and other objects, features and advantages of the disclosure will become apparent from the following detailed description of illustrative embodiments thereof, which is to be read in connection with the accompanying drawings.

DETAILED DESCRIPTION

Figure 1:
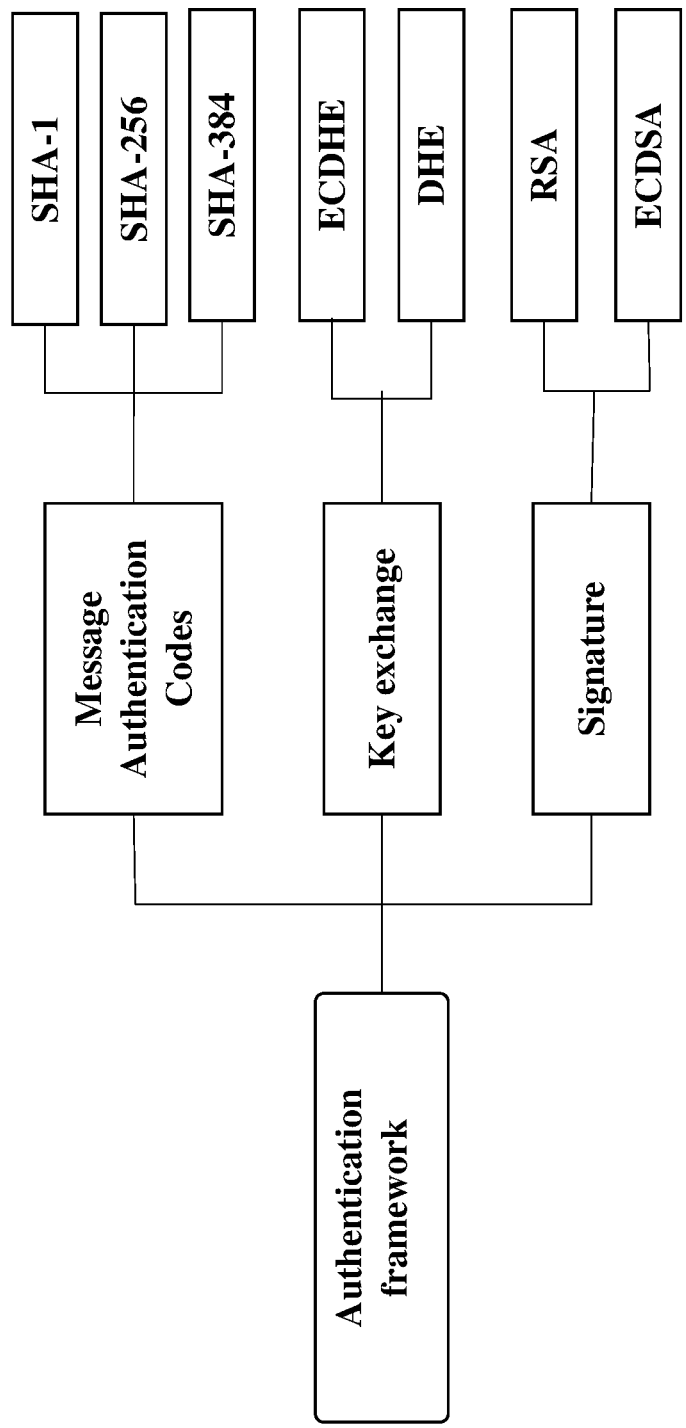
FIG. 1 lists several kinds of ciphering algorithms.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As discussed above, various security applications may have various security configuration approaches. The security application may comprise any application that involves processing or techniques to ensure security. The security application may comprise a communications application, a recording/storing application or any other suitable application. Each security application may have its own software architecture and implementation. A security configuration may comprise any suitable operations related to configuring security of an application. For example, a security configuration may related to, but not limited to, at least one of algorithms, keys, parameter for algorithms, seeds, algorithm implementations, security libraries and versions of a security protocol. The security configuration approaches may include configuration files and/or operating commands that are totally independent. Taking opensource based applications (e.g. TLS, IPSec, SSH etc.) as examples, security algorithms for TLS application are maintained using keywords within openssl framework; those for IPSec application are specified in the ike or esp configuration files; and those for SSH application are defined in sshd files. It should be noted that the particular security applications and security configurations described above and hereafter are only examples, and this disclosure is not limited to them in any way.

Figure 2:
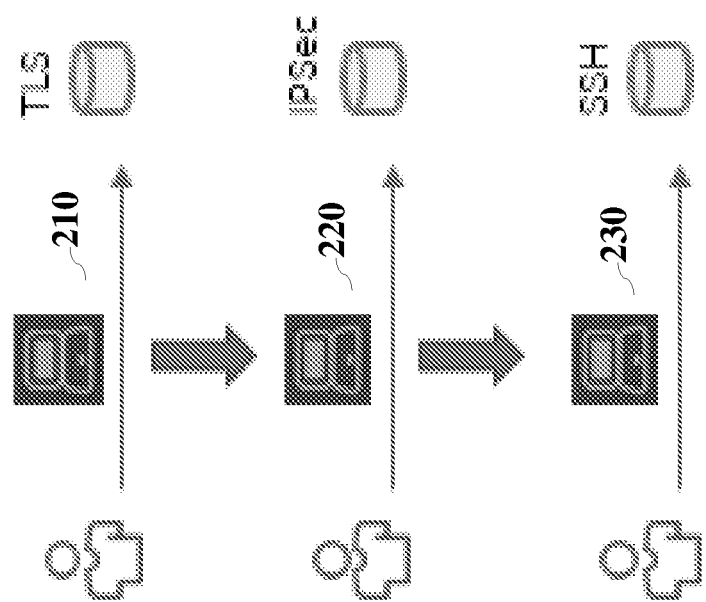
FIG. 2 illustrates an exemplary procedure of security algorithm setting in prior art.

FIG. 2 shows a traditional procedure of security algorithm setting. In prior art, a general mechanism for security updating is replacing one part of related codes/algorithms with a new one. For example, if it is required to replace SHA-1 algorithm with SHA-256 algorithm, an operator need to configure different kinds of security applications (e.g. TLS applications, IPSec applications and SSH applications) separately.

For example, for TLS applications, the supported cipher suites are listed in a TLS/SSL library, which are set by openssl keywords. The algorithm parameter of TLS applications can be configured as shown in step 210 of FIG. 2. For example, the "openssl ciphers-v 'SHA-256:!SHA1'" command can be executed to use SHA-256 algorithm as MAC (Message Authentication Codes) while SHA-1 algorithm is removed. The following command lines can be applied in the configuration.

```
root@host:/usr/lib/ssl/private# openssl ciphers -v 'SHA-256:!SHA1'
ECDHE-ECDSA-AES256-GCM-SHA384 TLSv1.2 Kx=ECDH  Au=ECDSA Enc=AESGCM(256) Mac=AEAD
ECDHE-RSA-AES256-GCM-SHA384 TLSv1.2 Kx=ECDH  Au=RSA Enc=AESGCM(256) Mac=AEAD
DHE-RSA-AES256-GCM-SHA384 TLSv1.2 Kx=DH  Au=RSA Enc=AESGCM(256) Mac=AEAD
```

For IPSec application, the operator can modify /etc/ipsec.conf configuration file manually to define IPSec authentication and encryption methods, as shown at step 220. For example, to disable the SHA-1 algorithm, all related cipher suites can to be removed through the follow configuration commands:

```
ike=aes128gcm16-prfsha256-ecp256,aes256gcm16-prfsha384-ecp384!
esp=aes128gcm16-ecp256,aes256gcm16-ecp384!
rightauth = pubkey-sha384-ecdsa
```

For SSH application, the operator can modify /etc/ssh/sshd_config configuration files manually to define SSH authentication and encryption methods, as shown at step 230. For example, in order to disable the SHA-1 algorithm, ciphers and MACs lines can be modified to exclude SHA-1 cipher suites, through the following configuration commands.

```
root@host:~# vim /etc/ssh/sshd_config
# This is the ssh client system-wide configuration file.
# ssh_config(5) for more information. This file provides defaults for
# users, and the values can be changed in per-user configuration files
# or on the command line.
Ciphers aes128-ctr,aes192-ctr,aes256-ctr,arcfour256,arcfour128,aes128-ebc,3des-cbc
MACs hmac-md5,hmac-sha1,umac-64@openssh.com,hmac-ripemd160
```

As shown in FIG. 2, the operator has to configure different security applications step by step, separately. In an actual mobile network, there are a mass of devices on which various security applications are running. In order to harmonize algorithm configurations in various security applications in the devices, the operator has to configure every device and every application separately, through the current configuration approach as FIG. 2. The manual operation is inefficient and may make mistake easily.

Figure 3:
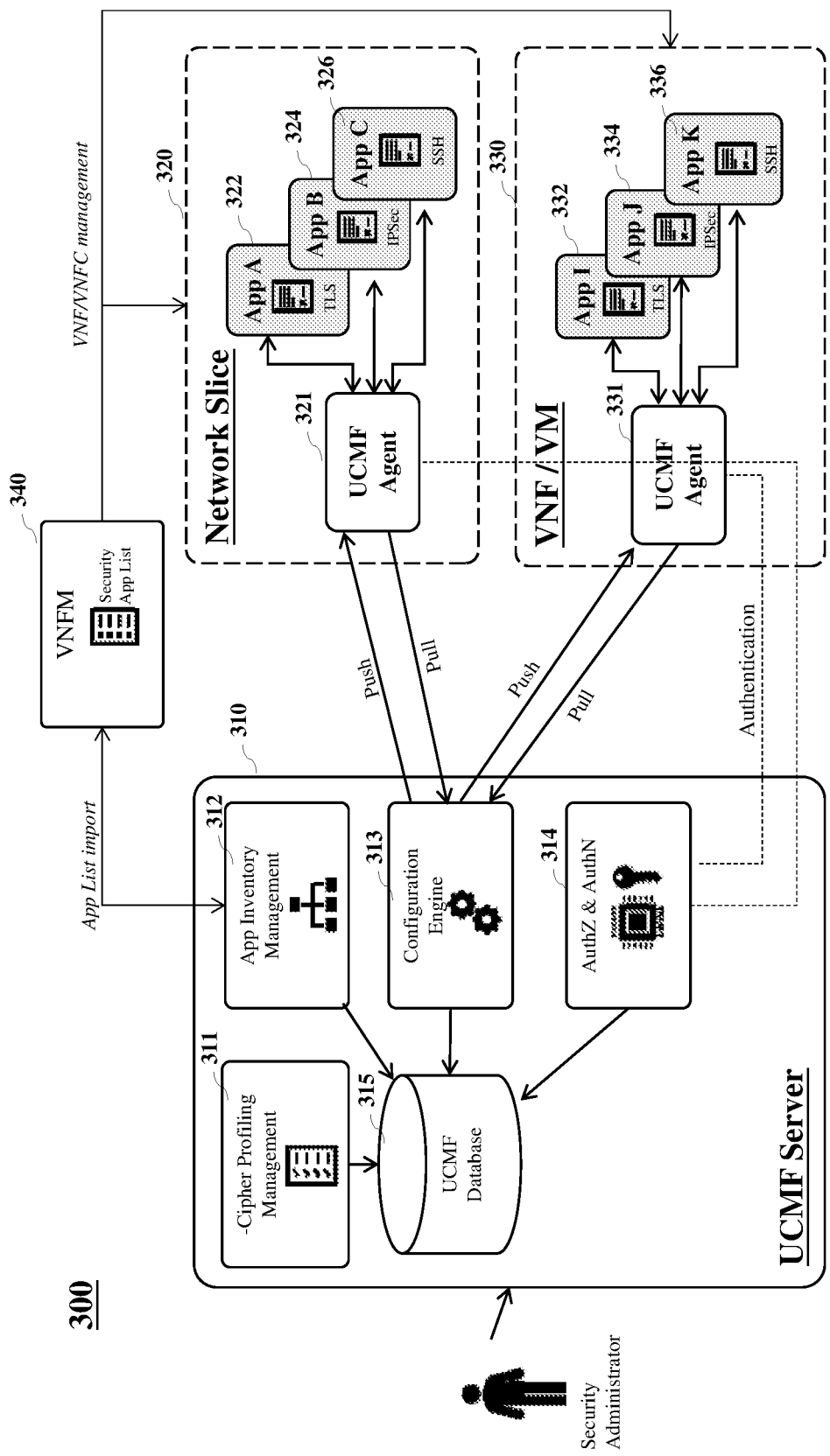
FIG. 3 illustrates an exemplary system architecture for unified security configuration according to embodiments of the present disclosure.

This disclosure shows a unified framework for managing common security configurations in network nodes. It can be used for Network Domain Security only, but also for cellular algorithms management, where the nodes communicate with cellular devices. The security configurations may involve configuring common cryptographic algorithms and related parameters in network nodes on which these algorithms are running. The framework can be referred to as a trusted unified ciphering management framework (UCMF) in this disclosure. FIG. 3 illustrates an example of the UCMF.

UCMF 300 is constructed with two parts, a UCMF server 310 and multiple UCMF agents (320, 330), as show in FIG. 3. The UCMF server can provide security configurations for multiple UCMF agents in a centralized manner. It should be appreciated that the UCMF server can also be a virtual functionality entity, and does not need to be a physical server.

A UCMF agent may be deployed in a network node, and configured to configure security of at least one security application running in the network node according to instructions from the UCMF server. Alternatively, the UCMF agent may be deployed outside its associated node, and connected to the node. The UCMF agent may be a virtual functionality entity, and does not need to be a physical entity. In some embodiments, the network node may be a virtual functionality entity, such as a virtual machine (VM), a virtual network function (VNF), or a virtual network function chain (VNFC). In some other embodiments, the network node may be a network slice. Each network slice is a logical self-contained network where a service runs on its own network slice. For example, one network slice can be directed to video, one network slice can be directed to internet of things (IoT), another network slice can be directed to critical communication, and so on. It's also possible to group multiple, similar services on one network slice. Each node may be installed with one or more security applications which involve various ciphering algorithms and security protocols, such as TLS, IPSec, SSH, etc.

The UCMF server 310 may be deployed inside a same entity as a UCMF agent, or in a remote server which can communicate with the UCMF agents remotely. In some embodiments, the UCMF server 310 may be deployed across network slices. In these embodiments, the UCMF agents can be different network slices. The UCMF 310 may handles instructions from an end user, such as a security administrator of a communication network, process the instructions with different configurations for different security applications, and then distribute to relevant UCMF agents for further processing.

As shown in FIG. 3, a UCMF sever 310 may maintain several functionality components, including a cipher profiling management component 311, an application inventory management component 312, and a configuration engine 313. The UCMF sever 310 may further comprise a database 350 for storing related data and parameters to be processed or been processed by the functionality components. In some other embodiments, the database 350 may be deployed outside the UCMF server 310, and may be accessible for the UCMF server 310 via communication connections. The UCMF sever 310 may comprise other components that are not illustrated in FIG. 3. For instance, in some examples the UCMF sever 310 may comprise a user interface, a transceiver, or any other suitable component.

The cipher profiling management component 311 is configured to maintain profiles of security configurations that are supported by the UCMF sever 311. In an example, the cipher profiling management component 311 may contain a series of ciphering algorithms that are supported for unified configuration. For example, in an instance that SHA-1 should not be used any more, and the security administrator may input an instruction of "Blocking SHA-1" to the UCMF server 310. Then, the UCMF server 310 may check SHA-1 in ciphering algorithm profiles maintained in the cipher profiling management component, to determine if a blocking operation for algorithm SHA-1 is supported. If it is supported, the UCMF server 311 may further process the instruction for various security applications in the UCMF agents.

The application inventory management component 312 is configured to maintain information of various security applications that are installed on network nodes. For example, in response to a determination that an inputted instruction is supported, the UCMF server 311 may be configured to check the application inventory management component 312 to determine a location of nodes on which security applications associated with the instructions are installed.

In some embodiments, address information of the nodes (e.g. network slices, or VNFs, or VMs, etc.) can be obtained from a network management entity, such as a virtual network function management (VNFM) entity. For example, the VNFM entity can be a part of NFV (Network Function Virtualization) Management and Orchestration or combined with a general O&M infrastructure or hosted by a service provider as a service for this network operator. For example, a large global operator might have one UCMF for all his subsidiaries or a trusted network provider runs a UCMF for his customers as a service. As shown in FIG. 3, the VNFM entity 340 may keep track where each node is instantiated, and maintain address information of the nodes. The address information of a node may comprise any information or data that can be utilized to address the node. The address information may comprise, but not limited to, an IP address, an application identifier, port, and any suitable fields for addressing a node. For example, in some cases, an ID of an application may be unique in the network and thus may be utilized to address the node on which the application is installed. Furthermore, the VNFM entity 340 may be configured to maintain a list of security applications installed in each node, and provide the list to the UCMF server 311 on demands.

The configuration engine 330 is configured to format the instructions corresponding to various security applications and send the formatted instructions to corresponding UCMF agents. For example, in the example for "blocking SHA-1", the configuration engine 330 may collect ciphering algorithm configuration information, and constructs TLS update instructions, IPSec update instructions and/or SSH update instructions according to ciphering algorithm configuration information for different security applications. Based on the application list on each node and each node's address, the configuration engine 330 can send a formatted instruction corresponding to a security application to UCMF agents of all nodes, on which the security application is installed. In some examples, there are more than one security applications running on a node. As shown in FIG. 3, node 320 can be installed with TLS, IPSec and SSH applications. Then, respective formatted instructions corresponding to TLS, IPSec and SSH applications can be sent to UCMF agent 321 together, and then be used by the UCMF agent 321 to configure TLS, IPSec and SSH applications separately.

In this way, if the security administrator wants to block SHA-1, he/she just instructs the UCMF server 310 to block SHA-1, then UCMF sever 310 will construct the SHA-1 block instruction for every security application and distribute to the relevant security applications for ciphering update.

In some embodiment, the UCMF server 310 may further comprises an authorization (authZ) and authentication (authN) component 314. It can comprise a trusted platform module (TPM) or similar secure computation element equipped on the server running the UCMF 310. This component is configured to support the secure communications among the UCMF server 310 and the UCMF agents, e.g. 320, 330, to ensure that the communication parts are really an authorized entity e.g. it may hold keys and certificates. TPM would use a highest security algorithm to ensure the security of authentication and authorization between the UCMF sever and agents. It can also serve as a secure key generation entity for the communication and just hold the key material for the initial handshake and communication key generation. The messages between the UCMF server 310 and the UCMF agent 320, 330 are protected by the functionality provided by this component.

In some embodiments, the component 314 may be a geographical location binding hardware. In this regard, geographical location information can be utilized for authentication. For example, messages to be sent from the UCMF server 310 can comprise geographical location information of the UCMF server 310. Then the UCMF agents can authenticate received messages based on the geographical location information.

The UCMF agent can be deployed in its associated node. Alternatively, the UCMF agent can be connected to its associated node. It can be configured with trusted credentials for UCMF management, which allows it to verify that messages from a UCMF server 310 are really coming from there. The credentials can be pre-installed into the UCMF agent e.g. during manufacturing or initial set-up time or being updated by the UCMF management previously.

Once the UCMF Server 310 handles a request from a security administrator (i.e. an end user) and formats corresponding instructions, the UCMF Server 310 will send the instructions to related UCMF agent(s). After a UCMF agent receives a configuration instruction, it can update a security configuration for corresponding security applications inside its associated node.

In some embodiments, a UCMF agent may also maintain application specific requirements, and may check whether a configuration instruction received from the UCMF sever is applicable for the corresponding security applications based on application specific requirements. For example, some algorithms or some key lengths may be not applicable for some particular security applications. In that case, when an instruction for cipher configuration arrived in a UCMF agent, the UCMF agent may check and handle an application specific requirement beforehand.

Through such unified ciphering management framework, a centralized and automatic configuration for different applications can be provided in an efficient and trusted way. With the UCMF scheme, an operator can manage their security configuration easier, even without having much more professional knowledge. The security configuration can be pushed to all security applications, and security applications can pull the security configurations from a UCMF server also. Two corresponding usage scenarios are described in detail as follows.

Figure 4:
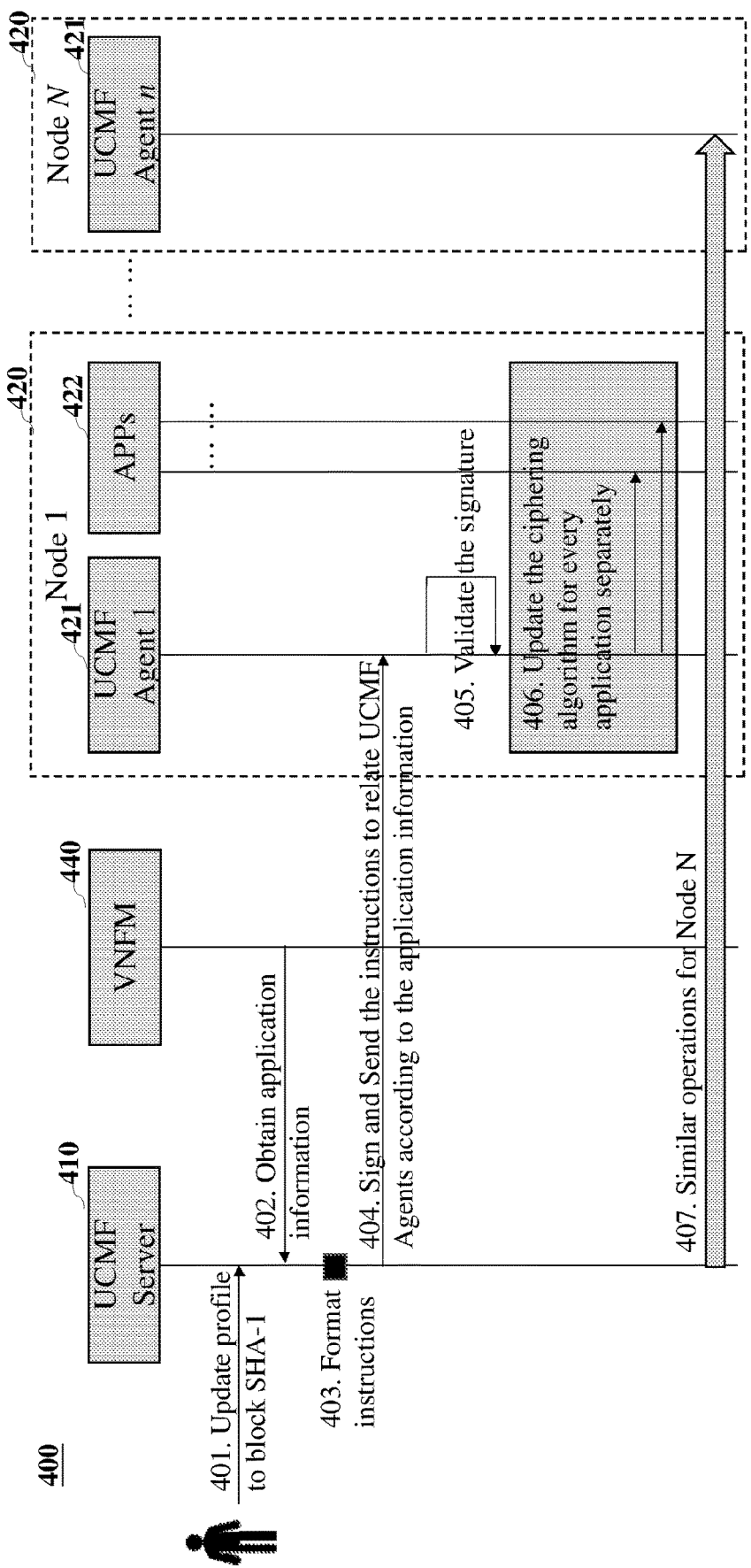
FIG. 4 illustrates an exemplary procedure of pushing security configurations according to embodiments of the present disclosure.

FIG. 4 illustrates an exemplary procedure of pushing security configurations from a UCMF server. In a scenario, an operator initiates a pushing of ciphering algorithm configuration to a plurality of UCMF agents. For example, the operator may want to disable SHA-1 algorithm for all security applications, due to that SHA-1 is considered not secure. FIG. 4 shows a procedure 400 for pushing such configuration.

As shown at 401, the operator updates profile to trigger a SHA-1 disable operation. For example, the operator may enter an instruction directly for blocking SHA-1 to the UCMF server 410. In another example, the UCMF server 410 may determine to disable SHA-1 indirectly from the operator's operations on network security. In other examples, the SHA-1 disable operation could occur in response to an external trigger event. For example, an updating of a core network could require that the SHA-1 should not be utilized anymore. In such examples the SHA-1 disable operation may occur automatically without any input from an end user of the UCMF server 410.

Next at 402, the UCMF server 410 may contact the VNFM 440 to obtain information of nodes on which security applications involving the SHA-1 algorithm are running. For example, the information may contain address information of the nodes, such as a slice identifier, a VNF identifier, a VM identifier, IP address, port, application identifier and the like. The UCMF server 410 may further obtain information of the corresponding security applications, e.g. identifiers of the corresponding security applications. In some embodiments, the UCMF server 410 may obtain the information in advance.

Next at 403, the UCMF server 410 may check whether the SHA-1 disable operation is supported, for example based on the series of supported ciphering algorithms maintained in the cipher profiling management component 311. If it is supported, the UCMF server 410 formats corresponding instructions for different security applications (e.g. TLS application, IPSec application, SSH application), according to corresponding application profiles. For example, the application profiles of a given application may comprise information from the cipher profiling management component 311 on how the given application is supported, and information from the application inventory management component 312 on how the given application is installed on associated nodes. With the regard to the formatting, the UCMF server 410 may check which security protocol is used by each security application, and then construct instructions according to the security protocol. For example, scripts for constructing instructions according to a given security protocol can be predefined, and stored in the UCMF database 315. It can be retrieved by the configuration engine component 320 automatically when it is determined that the instructions to be formatted should correspond to an application using the given security protocol.

Next at 404, the UCMF server 410 sends the instructions to all relate UCMF agents (commonly denoted as 421). The UCMF server 410 can sign the instructions with a TPM based credentials as authorization. In addition, the state of the UCMF server 410 can be signed. The state may be a description of the hardware and software configuration and status of the UCMF server 410. For efficiency reasons, bits for indicating the state is usually made small by using a mathematical function (e.g. hash function). This "state" can be signed with a cryptographic key. This value of the state is like a "summarized photo" of how the things should look like. So if one checks the state later, one can determine if the software and hardware is looking like the "summarized photo" that was taken earlier.

After received the instructions requesting to update security configurations, a UCMF agent 421 validates that the request is authorized by using preinstalled credentials, as shown at 405. If the signed state is transferred, the UCMF agent 421 may match the value of the state against the true value, namely "should be" values.

If the request is validated, then the UCMF agent 421 updates the ciphering algorithm configuration separately for all impact applications inside its associated node 420, as shown at 406.

The other UCMF agents can update the ciphering algorithm configuration in a similar way for all nodes. Their updating can be executed in parallel. After the updating is executed in a UCMF agent successfully, an indication of a successful update for a security application may be sent back to the UCMF server 410 (not shown). Accordingly, the UCMF server 410 may update the application-specific information for that application. Optionally, the indication of the successful update may be signed, for example with credentials of the UCMF agent. In this case, the UCMF server 410 may validate the indication by using a preinstalled credential.

Figure 5:
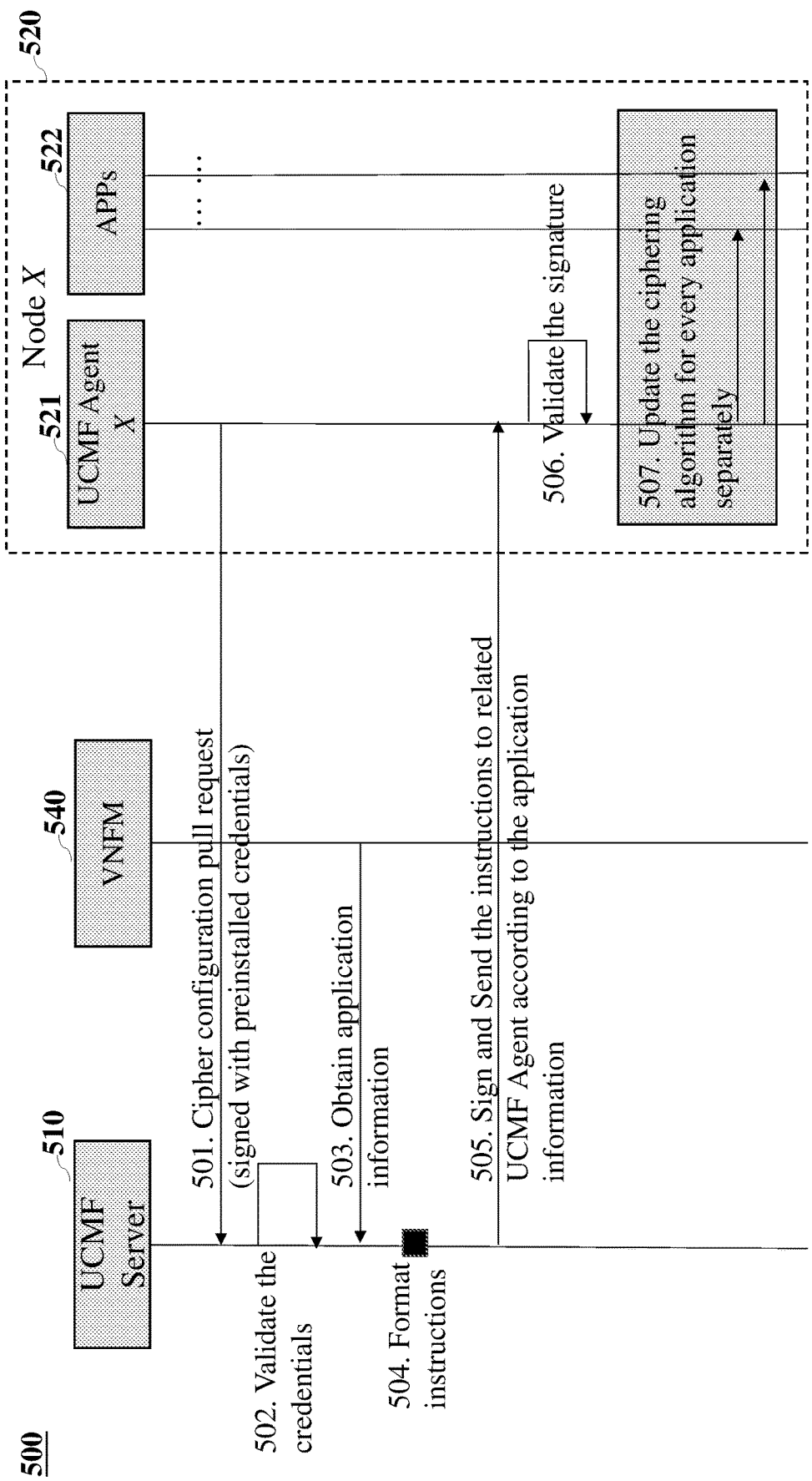
FIG. 5 illustrates an exemplary procedure of pulling security configurations according to embodiments of the present disclosure.

FIG. 5 illustrates an exemplary procedure of pulling security configurations from a UCMF agent. The UCMF agent may pull a ciphering algorithm on-demand from a UCMF server. The UCMF agent (or a security application running on a node associated with the UCMF agent) detects a gap between its real security configurations with the profiling in the UCMF server. For example, a target security application may detect that its ciphering algorithm is not compatible with other applications or other nodes in interworking. Then, the target security application may request the UCMF agent to trigger a pulling operation for updating its ciphering algorithm.

As shown at 501, a UCMF agent 521 sends a request of "security configuration pull" to a UCMF server 510. The request may be signed with preinstalled credentials.

The UCMF server 510 authenticates the received request to make sure that it is from an authorized UCMF agent, as shown at 502.

If the request is validated, then the UCMF server 510 format instructions for the requested "security configuration", as shown at 504. The security configuration may contain information e.g. related to the ciphering algorithms used.

In some embodiments, the request may contain information of security applications related to the requested security configuration, such as an application identifier of the target security applications. Meanwhile, the address information of the node 520 (e.g. the node's ID, IP address, and/or port number, an identifier of the target security application etc.) can also be determined from the request. Then, the UCMF server 510 can send the formatted instructions for "cipher configuration" to the UCMF agent 521 which is deployed and associated with the node 520, as shown at 505. Similar as the procedure for pushing configurations described with reference to FIG. 4, the formatted instructions can be signed.

In other embodiments, the UCMF server 510 contacts a VNFM 540 to obtain information of target applications related to the requested cipher configuration and address information of the associated node 520, as shown at 503. Then, the UCMF server 510 sends the formatted instructions to the UCMF agent 521, according to the information of the target applications and the address information.

The UCMF agent 521 receives the instructions for "security configuration", and validates the signature as shown at 506. If it is validated, the UCMF agent 521 may apply the cipher configuration changes to the target applications. In some embodiments, the target applications may comprise multiple security applications under different security protocols, such as TLS, IPSec, SSH, etc. Accordingly, the instructions comprise respective instructions directed to security protocols corresponding to respective applications. These applications will be configured according to the corresponding instructions separately.

Figure 6:
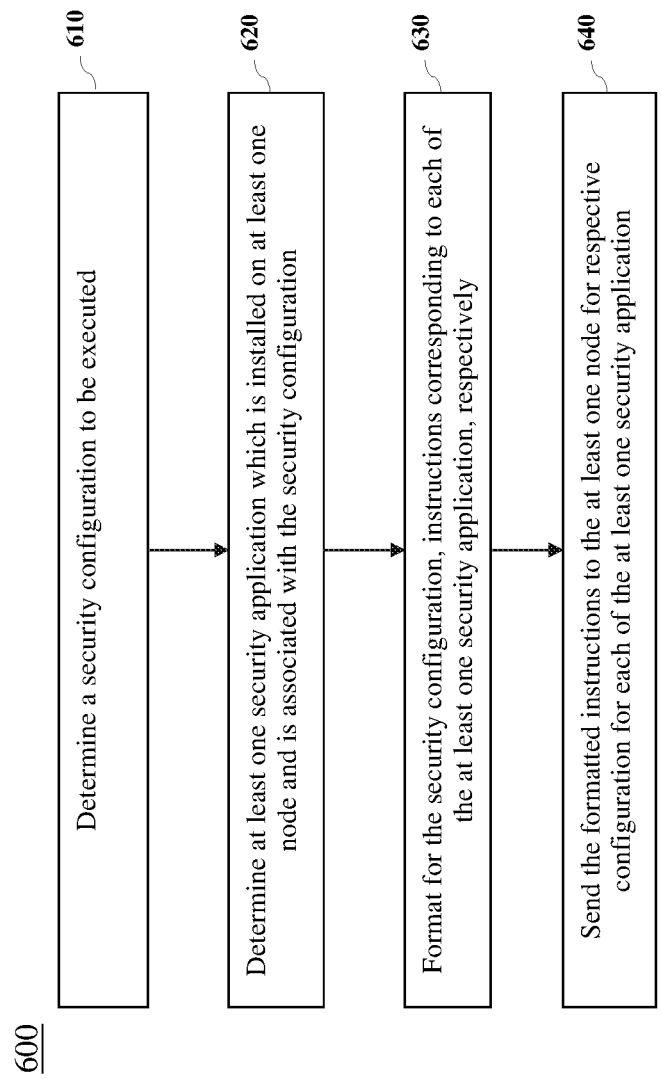
FIG. 6 is a flow chart depicting a method according to an embodiment of the present disclosure.

Reference is now made to FIG. 6, which illustrates a flowchart of a method for unified security management according to some embodiments of the disclosure. The method 600 can be performed at a UCMF sever, such as a UCMF server 310, 410, 510 as shown in FIGS. 3, 4 and 5.

As shown at block 610, the method 600 comprises determining a security configuration to be executed. In some embodiments, the security configuration may be triggered by an input from an end user of the UCMF server. In other embodiments, the security configuration may be triggered by a request from a UCMF agent, or from a node on which a target security application installed.

At block 620, the procedure of the method proceeds to determine at least one security application which is installed on at least one node and is associated with the security configuration. In some embodiments, address information of the at least one node can be obtained from a virtual network function management entity.

In some embodiments, the procedure of the method 600 may further proceed (not shown) to check whether the security configuration is supported. If it is supported, the method proceeds to format for the security configuration, instructions corresponding to each of the at least one security application, respectively, as shown at block 630.

Next at block 640, the procedure proceeds to send the instructions to the at least one node for respective configuration for each of the at least one security application. The instructions can be signed with a certificate of the server. The state of the server can be also signed and sent to the at least one node.

With the UCFM scheme as described above, operator's repeated manual work can be reduced, and the efficiency for security configuration can be increased exponentially. This UCFM scheme provides a unified method to apply and manage security mechanism in the network. In this regard, security profiles for various security configurations can be managed and executed in a unified manner. For example, the security profiles for various security configurations can be maintained in the cipher profiling management component 311, and security configurations on every nodes in the network can be executed according to the profiles. Furthermore, information about security applications installed in every node in the network can be management in a unified manner. For example, the application inventory management component 312 can obtain a list of security applications installed in every node. When it is necessary to execute a particular security configuration, e.g. blocking SHA-1, it is easy to find all related applications and nodes in the network. Accordingly, this can avoid missing any related applications for the security configuration.

Furthermore, the UCMF scheme encapsulates the diversity of communication protocols, cmdLines or technologies etc. for various security applications. For a security configuration, the UCMF sever can format instructions corresponding to various security applications, respectively. As such, management for security configuration can be executed with a unified operation on a UCMF server, without needing massive operations on security applications on each node in the network. Further, the security configuration can be configured for one time at the UCMF server, and can be executed for UCMF agents for multiple times and can be executed at multiple nodes.

Although the examples discussed above are with respect to updating ciphering algorithm, this UCMF scheme of this disclosure can be extended to support other type of security parameters and other security applications. For example, it can be applied to increase a key length for a particular kind of key. In another example, it can be applied to upgrade a version of a particular security protocol to a new version.

Figure 7:
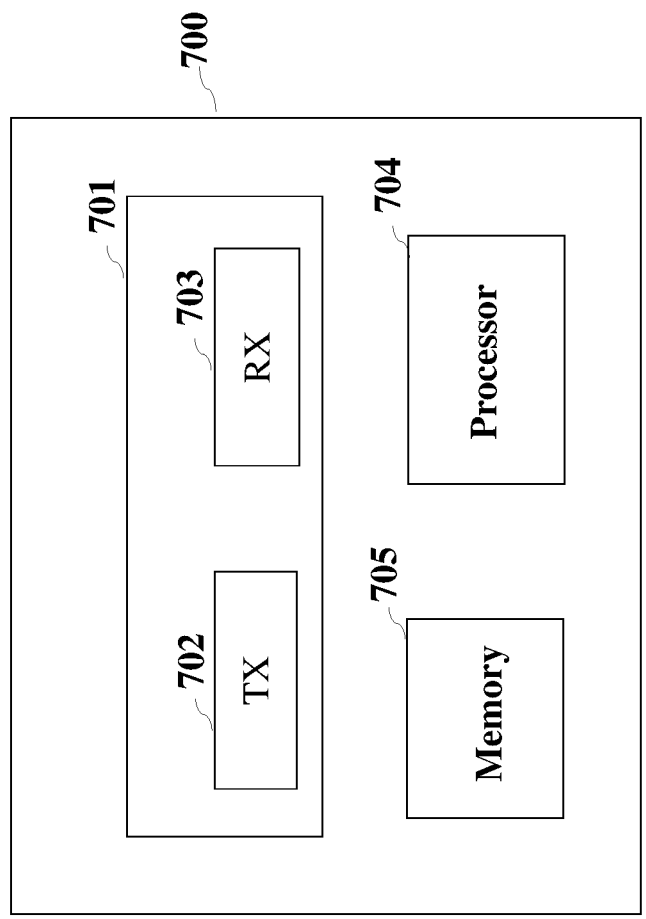
FIG. 7 shows a simplified block diagram of an apparatus according to an embodiment of the present disclosure.

FIG. 7 shows a simplified block diagram of an apparatus according to an embodiment of the present disclosure. The apparatus 700 can be implemented as a UCMF server or a UCMF agent or a module thereof as shown in FIG. 3-6. As shown in FIG. 7, the apparatus 700 comprises a processor 704, a memory 705, and a transceiver 701 in operative communication with the processor 704. The transceiver 701 comprises at least one transmitter 702 and at least one receiver 703. While only one processor is illustrated in FIG. 7, the processor 704 may comprises a plurality of processors or multi-core processor(s). Additionally, the processor 704 may also comprise cache to facilitate processing operations. For some same or similar parts which have been described with respect to FIGS. 3-6, the description of these parts is omitted here for brevity.

Computer-executable instructions can be loaded in the memory 705 and, when executed by the processor 704, cause the apparatus 700 to implement the above-described methods.

Additionally, an aspect of the disclosure can make use of software running on a computing device. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, random access memory (RAM), read only memory (ROM), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially simultaneously, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method, comprising:
   determining in a server a security configuration to be executed;
   determining at least two different security applications which are installed on at least one node and are associated with the security configuration, wherein the at least two different security applications use different security protocols;
   according to a security protocol used by each of the at least two different security applications, formatting for the security configuration, instructions corresponding to each of the at least two different security application, respectively; and
   sending the instructions to the at least one node for respective configuration for each of the at least two different security applications, wherein determining at least two different security applications comprises obtaining address information of the at least one node on which the at least two different security applications are installed, and wherein the address information is obtained from a virtual network function management entity.

2. The method according to claim 1, wherein the determining of the security configuration is triggered by the server.

3. The method according to claim 1, wherein the determining of the security configuration is triggered in response to a request from one of the at least one node.

4. The method according to claim 1, further comprising,
   receiving a request for executing the security configuration; and
   checking whether the security configuration is supported.

5. The method according to claim 1, wherein the at least one node comprises different network slices, or different virtual network functions and virtual machines.

6. The method according to claim 1, wherein the security configuration relates to at least one of the following: algorithms, keys, parameter for algorithms, seeds, algorithm implementations, security libraries and versions of a security protocol.

7. The method according to claim 1, further comprising:
   before the sending, signing the instructions with a cryptographic key bound to a certificate of the server.

8. The method according to claim 7, further comprising:
   signing a state of the server; and
   sending the signed state to the at least one node.

9. The method according to claim 1, further comprises:
predefining scripts for construction instructions according to a given security protocol;
storing the predefined scripts; and
retrieving the scripts when it is determined that the instructions to be formatted correspond to a security application using the given security protocol.

10. An apparatus, comprising:
at least one processor;
at least one memory including computer program code, the memory and the computer program code configured to, working with the at least one processor, cause the apparatus to:
determine a security configuration to be executed;
determine at least two different security applications which is installed on at least one node and are associated with the security configuration, wherein the at least two different security applications use different security protocols;
according to a security protocol used by each of the at least two different security applications, format for the security configuration, instructions corresponding to each of the at least one security application, respectively; and
send the instructions to the at least one node for respective configuration for each of the at least two different security applications, wherein information of the security applications comprises address information of the at least one node, and wherein the memory and the computer program code are further configured to, working with the at least one processor, to cause the apparatus to obtain the information from a virtual network function management entity.

11. The apparatus according to claim 10, wherein the memory and the computer program code are further configured to, working with the at least one processor, to cause the apparatus to receive a request from one of the at least one node, to trigger the formatting of the instructions and the sending of the formatted instructions.

12. The apparatus according to claim 10, wherein the security configuration relates to at least one of the following: algorithms, keys, parameter for algorithms, seeds, algorithm implementations, security libraries and versions of a security protocol.

13. The apparatus according to claim 10, wherein the memory and the computer program code are further configured to, working with the at least one processor, to cause the apparatus to sign the instructions with a cryptographic key bound to a certificate of the apparatus.

14. The apparatus according to claim 13, wherein the memory and the computer program code are further configured to, working with the at least one processor, to cause the apparatus to sign a state of the apparatus, and the configuration engine is further configured to send the signed state to the nodes on which the at least one security application is installed.

15. The apparatus according to claim 10, wherein the memory and the computer program code are further configured, working with the at least one processor, to
predefine scripts for constructing instructions according to a given security protocol,
store the predefined scripts; and
retrieve the scripts when it is determined that the instructions to be formatted correspond to a security application using the given security protocol.

16. A non-transitory computer program product comprising instructions which when executed by at least one processor, cause the at least one processor to perform the following:
determining a security configuration to be executed;
determining at least two different security applications which are installed on at least one node and are associated with the security configuration, wherein the at least two different security applications use different security protocols;
according to a security protocol used by each of the at least two different security applications, formatting for the security configuration, instructions corresponding to each of the at least two different security applications, respectively; and
sending the instructions to the at least one node for respective configuration for each of the at least two different security applications, wherein determining at least two different security applications comprises obtaining address information of the at least one node on which the at least two different security applications are installed, and wherein the address information is obtained from a virtual network function management entity.

17. The non-transitory computer program product according to claim 16, wherein the instructions cause the at least one processor to further perform the following:
predefining scripts for constructing instructions according to a given security protocol;
storing the predefined scripts; and
retrieving the scripts when it is determined that the instructions to be formatted correspond to a security application using the given security protocol.

* * * * *